United States Patent
Dakshinamurthy et al.

(10) Patent No.: US 10,169,368 B2
(45) Date of Patent: *Jan. 1, 2019

(54) INDEXING OF LINKED DATA

(71) Applicant: International Business Machines Corporation, Armonk, NY (US)

(72) Inventors: Karthikeyan Dakshinamurthy, Bangalore (IN); Arthur G. Ryman, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 14/504,461

(22) Filed: Oct. 2, 2014

(65) Prior Publication Data
US 2016/0098424 A1    Apr. 7, 2016

(51) Int. Cl.
*G06F 7/02*     (2006.01)
*G06F 17/30*    (2006.01)

(52) U.S. Cl.
CPC .. *G06F 17/30185* (2013.01); *G06F 17/30117* (2013.01); *G06F 17/30144* (2013.01); *G06F 17/30321* (2013.01); *G06F 17/30345* (2013.01)

(58) Field of Classification Search
None
See application file for complete search history.

(56) References Cited

U.S. PATENT DOCUMENTS

| | | | | |
|---|---|---|---|---|
| 9,471,655 | B2* | 10/2016 | Aoyama | G06F 17/30572 |
| 2002/0194251 | A1* | 12/2002 | Richter | G06F 9/5011 |
| | | | | 718/105 |
| 2006/0020657 | A1 | 1/2006 | Liu et al. | |
| 2007/0255711 | A1 | 11/2007 | Zhou et al. | |
| 2008/0154914 | A1* | 6/2008 | Kan | G06F 11/1458 |
| 2009/0113076 | A1* | 4/2009 | Long | G06F 17/30174 |
| | | | | 709/248 |
| 2009/0265686 | A1* | 10/2009 | Lucas | G06F 9/4436 |
| | | | | 717/120 |
| 2011/0125904 | A1 | 5/2011 | Branigan et al. | |
| 2012/0086544 | A1* | 4/2012 | Kemp | G06F 9/5072 |
| | | | | 340/5.1 |

(Continued)

FOREIGN PATENT DOCUMENTS

CN    101064641 A    10/2007

OTHER PUBLICATIONS

"TrackedResourceSet 2.0," Speicher, Steve et al, Jun. 27, 2013, taken from web.archive.org froim http://open-services.net/wiki/core/TrackedResourceSet2.0/ on Oct. 27, 2016.*

(Continued)

*Primary Examiner* — Bruce M Moser
(74) *Attorney, Agent, or Firm* — Nicholas L. Cadmus; Noah A. Sharkan

(57) ABSTRACT

In one embodiment of the present invention, one or more computer processors create update commands that describe a state change of a resource and include the update commands in a change event for the resource in a change log. Embodiments of the present invention can obviate the need for an indexer to retrieve all triples of a changed resource via HTTP GET requests, and obviate the need for the indexer to replace all triples of a prior version of a changed resource with newly obtained triples.

10 Claims, 4 Drawing Sheets

(56) References Cited

U.S. PATENT DOCUMENTS

| | | | |
|---|---|---|---|
| 2012/0166513 A1 | 6/2012 | Fortune et al. | |
| 2013/0041687 A1* | 2/2013 | Brush | G06Q 50/22 705/3 |
| 2013/0290253 A1* | 10/2013 | Budinsky | G06F 17/30557 707/624 |
| 2015/0356116 A1* | 12/2015 | Lin | G06F 17/30212 707/613 |

OTHER PUBLICATIONS

"Indexing of Linked Data", U.S. Appl. No. 14/745,525, filed Jun. 22, 2015, pp. 1-32.

IBM Appendix P, list of IBM patents or patent applications treated as related, Jun. 22, 2015, pp. 1-2.

Beckett et al., "RDF 1.1 Turtle—Terse RDF Triple Language", W3C® , W3C Recommendation Feb. 25, 2014, Copyright © 2008-2014 W3C® (MIT, ERCIM, Keio, Beihang), <http://www.w3.org/TR/turtle/>.

Dakshinamurthy, Karthikeyan, "Improve Rational Focal Point queries by using the Lifecycle Query Engine", IBM® , Apr. 5, 2013, <http://www.ibm.com/developerworks/rational/library/rational-focal-point-queries-lifecycle-query-engine/>.

Gearon et al., "SPARQL 1.1 Update", W3C® , W3C Recommendation Mar. 21, 2013, Copyright © 2013 W3C® (MIT, ERCIM, Keio, Beihang), <http://www.w3.org/TR/sparql11-update/>.

Ryman, Arthur and Des Rivieres, Jim, "Open Services for Lifecycle Collaboration Indexable Linked Data Provider Specification Version 2.0, TRS Patch and TRS Patch Guidance", May 6, 2014, Open Services for Lifecycle Collaboration, <http://open-services.net/wiki/core/IndexableLinkedDataProvider-2.0/#TRS-Patch>, <http://open-services.net/wiki/core/IndexableLinkedDataProvider-2.0/#TRS-Patch-Guidance>, Grace Period Disclosure.

Speicher et al., "TrackedResourceSet 2.0—Open Services for Lifecycle Collaboration Tracked Resource Set Specification Version 2.0", All content Creative Commons Attribution 3.0 US (http://creativecommons.org/licenses/by/3.0/us/) unless otherwise specified, Jun. 11, 2014, <http://open-services.net/wiki/core/TrackedResourceSet-2.0/>.

IBM, "Tracking changes by using TRS and LQE", IBM Knowledge Center, Rational DOORS 9.4.0.1, provided in search on Sep. 18, 2013, <http://www-01.ibm.com/support/knowledgecenter/SSYQBZ_9.4.0.1/com.ibm.doors.install.doc/topics/r_trs.html?lang=en>.

* cited by examiner

INDEXING OF LINKED DATA

The following disclosure(s) are submitted under 35 U.S.C. § 102(b)(1)(A):

DISCLOSURE(S)

(1) Arthur Ryman, Jim des Rivieres, Open Services for Lifecycle Collaboration Indexable Linked Data Provider Specification Version 2.0, TRS Patch and TRS Patch Guidance, May 6, 2014, Open Services for Lifecycle Collaboration, http://open-services.net/wiki/core/IndexableLinkedDataProvider-2.0/#TRS-Patch; http://open-services.net/wiki/core/IndexableDataProvider-2.0/#TRS-Patch-Guidance.

FIELD OF THE INVENTION

The present invention relates generally to the field of indexing data, and more particularly to indexing of linked data.

BACKGROUND OF THE INVENTION

Linked Data technologies enable structured data from many different sources to be integrated and related on a large scale. Linked Data technologies often employ the resource description framework (RDF) data model. In the RDF data model, each resource (e.g., a data file) comprises one or more triples of the form: subject, predicate, and object. Each resource is associated with one or more unique uniform resource identifiers (URI), such as a uniform resource locators (URL), at which the resource is located, and from which all triples comprising the resource can be obtained via HTTP GET. Each triple of an RDF resource can also be regarded as having the form: resource (e.g., the URI of the resource, such as "https://example-resource-uri.net/123456"), property (e.g., the URI of a property of the resource, such as "http://purl.org/dc/terms/title"), and property value (e.g., a string literal, such as "Example Title", or a URI for another resource). A particular resource may comprise one triple or a plurality of triples.

The tracked resource set (TRS) specification defines a protocol by which a set of resources can be exposed by servers (i.e., providers) and made available to clients (i.e., consumers), along with information tracking additions of resources to the set, removals of resources from the set, and state changes (i.e., additions, removals, and/or modifications of triples) of resources in the set. Aspects of the RDF data model and the TRS specification may be expressed using the Turtle (Terse RDF Triple Language) textual syntax. Each tracked resource set possesses an HTTP URI. An HTTP GET request sent to this URI returns data comprising a base and change log. The base enumerates all member resources of the resource set at a given point in time, and the change log contains any change events for particular member resources that have been created, deleted, or have changed state. A consumer can create and maintain a replica of the resources in a tracked resource set by querying a TRS provider and making a series of HTTP GET requests to retrieve changed resources.

SUMMARY

In one embodiment of the present invention, a method is provided in which responsive to a state change of a resource in a tracked resource set, one or more computer processors create one or more update commands that describe the state change of the resource. One or more computer processors create a change event for the resource in a change log, and the change event comprises the created one or more update commands that describe the state change of the resource.

DETAILED DESCRIPTION

Embodiments of the present invention recognize that changes to a resource are typically made in a recurring, incremental fashion. Thus, changes to a resource typically entail changes to only a subset of the triples comprising the resource. Typically, even though only a subset of the triples of the resource have changed, a consumer or client indexing the changed resource would perform an HTTP GET to obtain all of the triples of the changed resource (including redundant copies of unchanged triples) and delete all of the triples comprising the previously indexed version of the resource. These processes can increase the time, computational resources, and bandwidth required to build and maintain an index of resources for one or more linked data applications. Embodiments of the present invention can include one or more update commands in change events of a tracked resource set (e.g., trs:Modification and/or trs:Creation change events), thereby obviating the need for an indexer to retrieve all changed resources via HTTP GET requests, and obviating the need for the indexer to replace all triples of a prior version of a changed resource with newly obtained triples.

Figure 1:
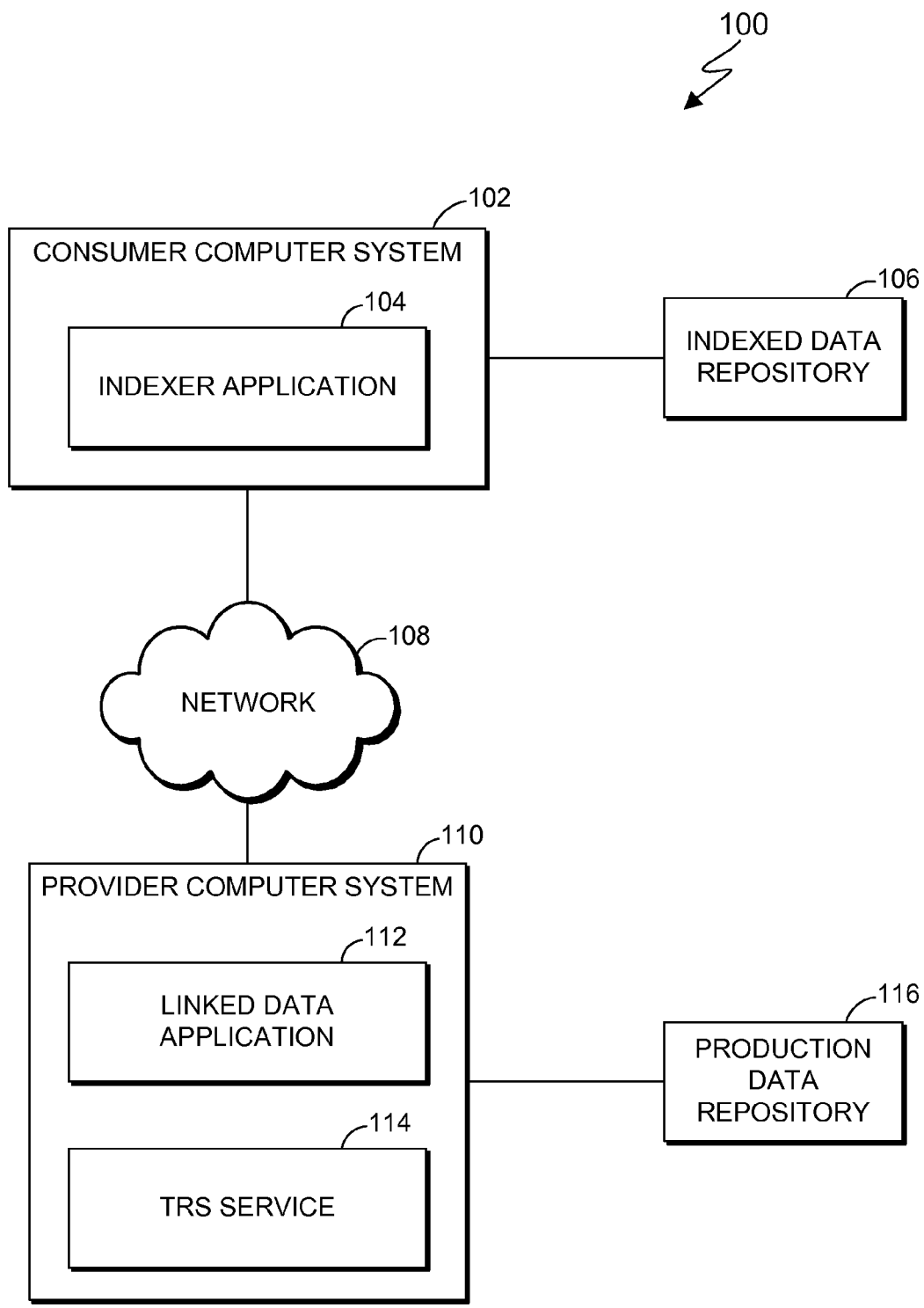
FIG. 1 is a block diagram of a computing environment, in accordance with an embodiment of the present invention.

FIG. 1 is a functional block diagram of a computing environment 100, in accordance with an embodiment of the present invention. Computing environment 100 includes consumer computer system 102 and provider computer system 110, interconnected by network 108. Consumer computer system 102 and provider computer system 110 can be desktop computers, laptop computers, specialized computer servers, or any other computer systems known in the art. In certain embodiments, consumer computer system 102 and provider computer system 110 represent computer systems utilizing clustered computers and components to act as a pool of seamless resources when accessed through network 108. For example, such embodiments may be used in data center, cloud computing, storage area network (SAN), and network attached storage (NAS) applications. In certain embodiments, consumer computer system 102 and provider computer system 110 represent virtual machines. In general, consumer computer system 102 and provider computer system 110 are representative of any electronic devices, or combination of electronic devices, capable of executing machine-readable program instructions, as described in greater detail with regard to FIG. 4.

Consumer computer system 102 includes indexer application 104 and indexed data repository 106. Indexer application 104 indexes linked data that is created by linked data application 112 and stored on production data repository 116. Indexer application 104 stores and indexes linked data on indexed data repository 106. In various embodiments of the present invention, linked data is generated, stored, and manipulated as resources using the resource description framework (RDF) data model.

Indexed data repository 106 is used by indexer application 104 to store and index resources for query by one or more applications. Indexed data repository 106 can be implemented using any suitable storage media and database architectures known in the art. For example, indexed data repository 106 may be implemented with one or more independent hard disk drives, or multiple hard disk drives in a redundant array of independent disks (RAID), having one or more relational databases, object-oriented databases, and/or tables. Indexed data repository 106 may also be implemented with a specialized framework for RDF resources (i.e., a triple store), such as Apache Jena.

Provider computer system 110 includes linked data application 112, tracked resource set (TRS) service 114, and production data repository 116. Linked data application 112, along with TRS service 114, create and store resources on production data repository 116, which may then be indexed by indexer application 104. Resources stored on production data repository 116 are accessible by indexer application 104 by HTTP GET requests sent to resource-specific URIs via network 108. Linked data application 112 may be, for example, application lifecycle management software, such as IBM® Rational® Engineering Lifecycle Manager and/or Rational Team Concert™, available from International Business Machines of Armonk, N.Y. TRS service 114 provides linked data application 112 with ability to create, store, manipulate, and expose RDF resources using the tracked resource set (TRS) specification. In general, linked data application 112 and TRS service 114 may be implemented with any application or suite of applications that are configured to support the TRS specification.

As discussed in greater detail in this specification, TRS service 114 acts as a TRS provider, maintaining a tracked resource set of resources created by linked data application 112 and stored on production data repository 116. Indexer application 104 acts as a consumer and may query TRS service 114 via network 108 to build and maintain a searchable, up-to-date index of the resources stored on production data repository 116. In addition to adding standard change events to the change log, as discussed above, TRS service 114 can include one or more update commands in certain change events, such as modification change events for modifications made to a resource by linked data application 112 and creation change events for new revision resources (e.g., a resource associated with a revision history) created by linked data application 112. The term "update commands", as used herein, refers to one or more commands or instructions that can be executed by indexer application 104 to update an indexed copy of the changed resource already stored in indexed data repository 106 to reflect the modifications made to the changed resource. That is, update commands describe changes to the one or more triples comprising the changed resource, thereby enabling indexer application 104 to modify the one or more changed triples of the indexed copy of the changed resource, and obviating the need for indexer application 104 to perform an HTTP GET request for the changed resource to obtain all of its triples. In this exemplary embodiment, update commands comprise one or more SPARQL Update commands. In other embodiments, update commands can be expressed in RDF Patch format. In general, update commands can be expressed in any format compatible with indexer application 104 and TRS service 114.

Production data repository 116 is used by linked data application 112 and TRS service 114 to store resources, each of which is accessible by a URI via HTTP GET requests over network 108. Production data repository 116, like indexed data repository 106, can be implemented using any suitable storage media and database architectures known in the art. For example, production data repository 116 may also be implemented with one or more independent hard disk drives, or multiple hard disk drives in a redundant array of independent disks (RAID), having one or more relational databases, object-oriented databases, and/or tables. Production data repository 116 may also be implemented with a specialized framework for RDF resources (i.e., a triple store), such as Apache Jena TDB.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between consumer computer system 102, indexed data repository 106, provider computer system 110, and production data repository 116, in accordance with a desired embodiment of the present invention.

It should be understood that, for illustrative purposes, FIG. 1 does not show other computer systems and elements which may be present when implementing embodiments of the present invention. For example, while FIG. 1 shows a single provider computer system 110 having a single linked data application, computing environment 100 can include additional provider computer systems and linked data applications whose resources are indexed by consumer computer system 102.

Figure 2:
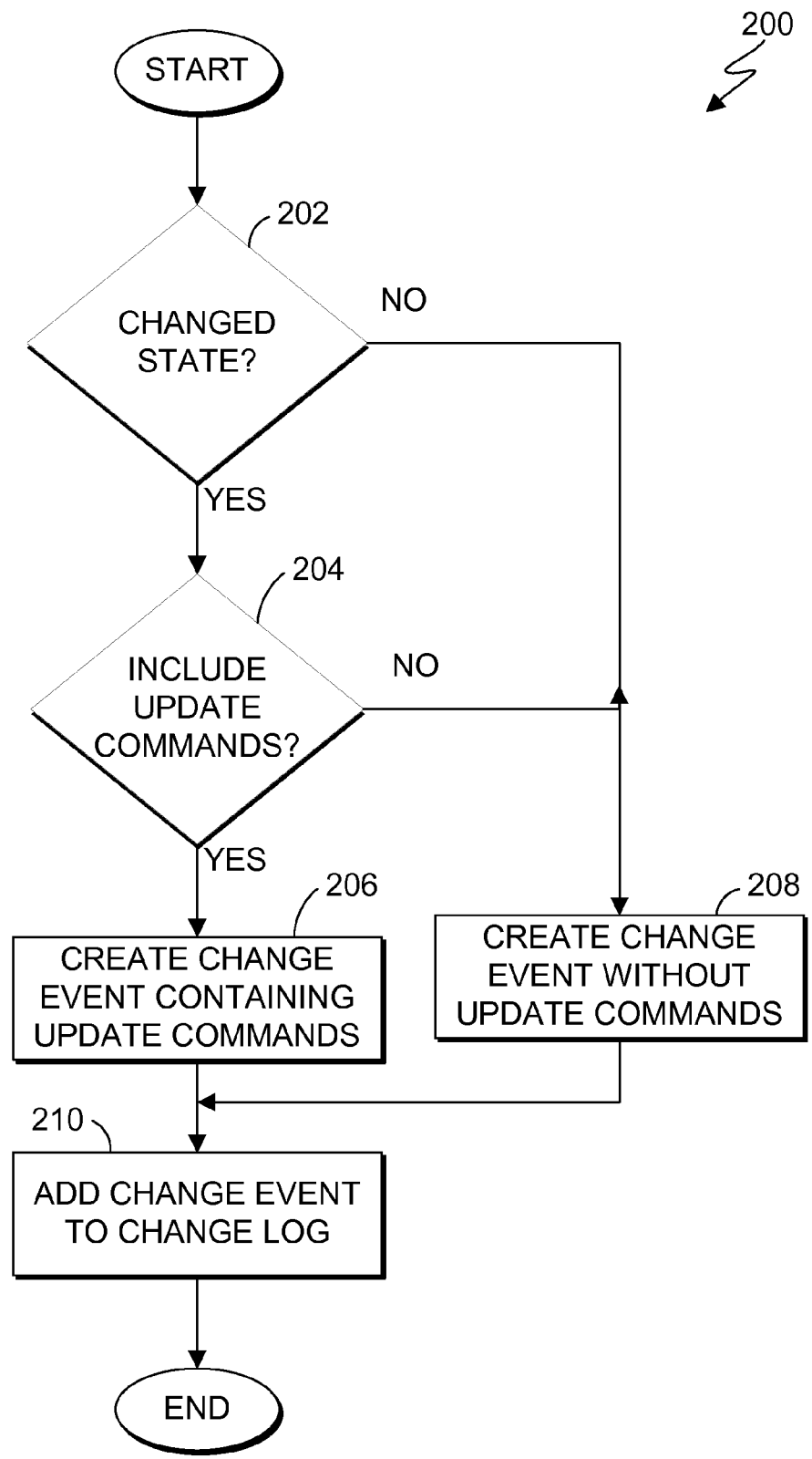
FIG. 2 is a flowchart illustrating operational steps for adding a change event to a tracked resource set change log, in accordance with an embodiment of the present invention.

FIG. 2 is a flowchart 200 illustrating operational steps for adding a change event to a TRS change log, in accordance with an embodiment of the present invention. In this exemplary embodiment, the operational steps of flowchart 200 are performed by TRS service 114 when generating TRS data, and are repeated for each changed resource of a TRS. For example, a changed resource may be a newly created resource which has been added to the TRS, a resource which has been removed from the TRS, or a resource which has changed state, as a result of linked data application 112 creating, deleting, and/or modifying the resource. TRS service 114 may generate TRS data in response to various conditions, such as in response to a query from indexer application 104, when linked data application 112 (or another application) makes a change to the resource, or pursuant to a schedule (e.g., as a low priority background task that is performed when TRS service 114 is idle). For illustrative purposes, the following discussion of FIG. 2 is made with respect to a single TRS; however, it should be understood that the operational steps of FIG. 2 may be performed for each of a plurality of TRSs.

In step 202, TRS service 114 determines whether the changed resource has changed state. The changed resource changes state when the one or more triples comprising the changed resource have been changed (e.g., a triple has been added, a triple has been deleted, or the predicate and/or object of a triple have changed).

If, in step 202, TRS service 114 determines that the changed resource has not changed state, then, in step 208, TRS service 114 creates the appropriate change event, without any update commands. For example, where the changed resource has been added to the TRS, TRS service 114 creates a change event of the type "trs:Creation"; where the changed resource has been removed from the TRS, TRS service 114 creates a change event of the type "trs:Deletion". It will be understood by those of ordinary skill in the art that, pursuant to the TRS specification, change events created by TRS service 114 also include additional information, such as a "trs:changed" property providing the URI of the changed resource and a "trs:order" property providing a chronological order of the change event relative to other change events in the change log.

If, in step 202, TRS service 114 determines that the changed resource has changed state, then, in step 204, TRS service 114 determines whether to include one or more update commands in the change event for the changed resource pursuant to specified criteria. As previously discussed, update commands describe modifications to the one or more triples comprising the changed resource, thereby enabling indexer application 104 to modify the one or more changed triples of the indexed copy of the changed resource to reflect the new state, rather than perform an HTTP GET request on the URI of the changed resource to obtain all of its triples (i.e., the changed triples as well as redundant copies of triples that remain the same in the most recent version of the changed resource).

In this exemplary embodiment, an administrative user of TRS service 114 can specify criteria that indicates when TRS service 114 should include update commands in a change event. For example, the administrative user can specify criteria based on a relative cost of updating an indexed resource with one or more update commands versus the relative cost of replacing an indexed resource using HTTP GET. A relative cost for updating the indexed resource ($Cost_{update}$) can be calculated, for example, using the following formula:

$$Cost_{update} = A * N_{affected\_triples} \quad \text{Formula 1}$$

where A is a parameter that is set by the administrative user and is related to network bandwidth of network 108 and the rate at which indexer application 104 can apply the one or more update commands, and $N_{affected\_triples}$ is the sum of triples that will be deleted and inserted in the indexed resource by the one or more update commands. A relative cost for replacing the indexed resource using HTTP GET ($Cost_{replace}$) can be calculated, for example, using the following formula:

$$Cost_{replace} = B + (C * N_{resource\_triples}) \quad \text{Formula 2}$$

where B is a parameter that is set by the administrative user and is related to overhead (e.g., computational resources, time, etc.) of creating a new HTTP request, C is a parameter that is set by the administrative user and is related to network bandwidth of network 108 and the rate at which indexer application 104 can replace the indexed resource (i.e., delete existing indexed triples and index all replacement triples), and $N_{resource\_triples}$ is the total number of triples comprising the changed resource. Accordingly, the administrative user can specify that TRS service 114 should include update commands in a change event if $Cost_{update}$ is less than $Cost_{replace}$.

In another embodiment, the administrative user can specify criteria for including update commands in a change event based on the frequency with which the changed resource has been changed. For example, a resource may be changed many times in a short period of time, so the administrative user may specify that if the frequency with which the changed resource has been changed exceeds a specified threshold (e.g., fifty times in one minute or less), TRS service 114 should not include update commands in each of those change events, but should instead coalesce all of those changes into a single change event that does not include update commands. In this manner, indexer application 104 may index the most recent version of the changed resource by performing an HTTP GET of all triples of the changed resource, rather than processing a plurality of incremental change events having update commands.

If, in step 204, TRS service 114 determines that, pursuant to the specified criteria, update commands should not be included in the change event, then, in step 208, TRS service 114 creates a change event without any update commands, as previously discussed.

If, in step 204, TRS service 114 determines that, pursuant to the specified criteria, one or more update commands should be included in the change event for the changed resource, then, in step 206, TRS service 114 creates a change event in the TRS containing one or more update commands that describe the state change of the changed resource. The state change of the changed resource may involve, for example, the addition of one or more triples, the removal of one or more triples, and/or changes to the predicate and/or object of one or more triples. The extent to which update commands can describe state changes depends on the format (i.e., type, language, etc.) of update commands. In this exemplary embodiment, TRS service 114 generates the update commands in the form of one or more SPARQL Update commands, which is an expressive language. For example, SPARQL Update commands such as "INSERT", "DELETE", and "DELETE WHERE" may be used to instruct indexer application 104 to delete certain triples, insert certain triples, and/or modify the subjects and predicates of certain triples. In other embodiments, the update commands can be provided in other formats, such as RDF Patch format, which is less expressive and may be used to instruct indexer application 104 to delete or insert certain triples, but cannot specifically describe modifications to subjects and predicates of triples. In this exemplary embodiment, any such update commands are provided as an additional property (e.g., trsx:sparqlUpdate) in the change event, and do not replace any ordinary properties of the change event (i.e., trs:changed property providing the URI of the changed resource, trs:order property providing a chronological order of the change event relative to other change events in the change log, etc.). In some embodiments, when querying TRS service 114, indexer application 104 can include a preference for a particular format of update commands, and TRS service 114 may generate update commands in that preferred format.

In this exemplary embodiment, the change event created by TRS service 114 in step 206 may be a modification change event (i.e., trs:Modification) or a creation change event (i.e., trs:Creation). For example, where linked data application 112 modifies a resource, the change event created by TRS service 114 may be a modification change event. Alternatively, such as in the context of configuration management, modifications to content of a resource may result in creation of a new revision resource, which can be linked to the resource it was created from and can be associated with a revision history for that resource. Thus, where a new revision resource is created, TRS service 114 may create a creation change event that also comprises an additional property (e.g., trsx:createdFrom) that indicates the resource from which the new revision resource was created.

In this exemplary embodiment, in addition to the one or more update commands, TRS service 114 generates and includes in the change event a version identifier of the changed resource before the state change, and a version identifier of the changed resource after the state change. When indexing a changed resource, as discussed in greater detail with regard to FIG. 3, these version identifiers enable indexer application 104 to ensure that update commands are only applied to the correct version of an indexed resource. In this exemplary embodiment, version identifiers are included as an additional property in the change event in the form of HTTP ETags (e.g., trsx:beforeETag and trsx:afterETag) having unique numerical values. In other embodiments, other types of version identifiers may be used, such as HTTP Last-Modified dates.

In step 210, TRS service 114 adds the change event created in step 206 or step 208 to the change log of the TRS. A more detailed example of TRS data comprising change events having update commands is discussed later in this specification.

Figure 3:
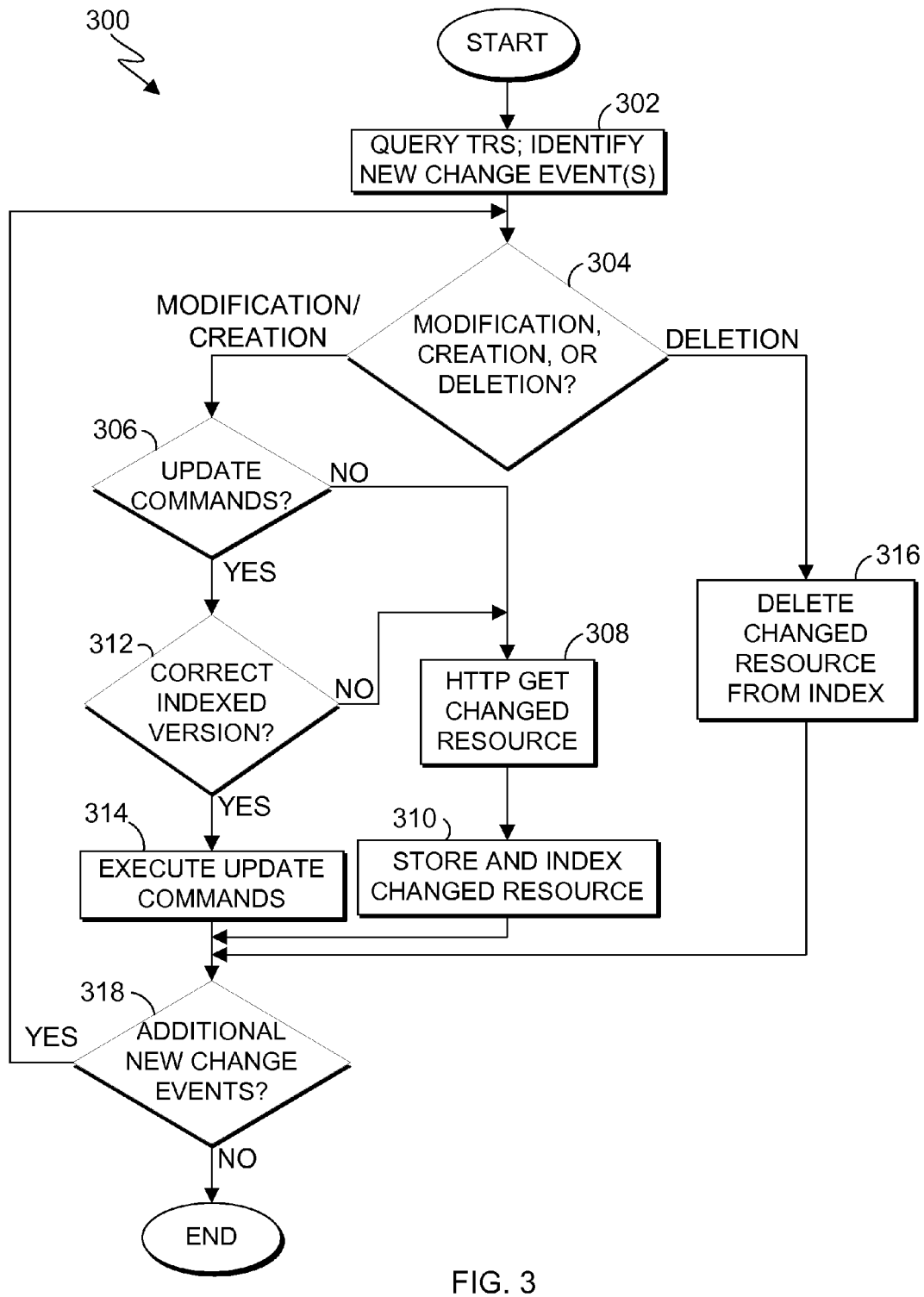
FIG. 3 is a flowchart illustrating operational steps for indexing a changed resource, in accordance with an embodiment of the present invention.

FIG. 3 is a flowchart 300 illustrating operational steps for indexing changed resources, in accordance with an embodiment of the present invention. For illustrative purposes, the following discussion is made with respect to a single TRS of resources stored on production data repository 116; however, it should be understood that the operational steps of FIG. 3 may be performed for each of a plurality of TRSs.

In step 302, indexer application 104 queries TRS service 114 to identify one or more new change events for the resources of the TRS. In this exemplary embodiment, indexer application 104 obtains TRS data by sending an HTTP GET request to the URI of the TRS via network 108. Indexer application 104 then analyzes the change log of the obtained TRS data to identify one or more change events that have occurred since the last time indexer application 104 queried TRS service 114. For example, each time indexer application 104 queries TRS service 114, indexer application 104 can record the numerical order value of the "trs:order" property for the most recent change event in the change log (i.e., the change event having the greatest numerical order value). When indexer application 104 subsequently queries TRS service 114, any change events having a numerical order value that is greater than the previous recorded value can be regarded as new change events.

In step 304, indexer application 104 determines whether a first change event of the identified one or more new change events is a modification change event (i.e., trs:Modification), a creation change event (i.e., trs:Creation), or a deletion change event (i.e., trs:Deletion). In this exemplary embodiment, indexer application 104 first processes the oldest of the identified one or more new change events (i.e., the new change event having the lowest numerical order value).

If, in step 304, indexer application 104 determines that the change event is either a modification change event or a creation change event, then, in step 306, indexer application 104 determines whether the change event includes one or more update commands. In this exemplary embodiment, any such update commands are provided as an additional property (e.g., trsx:sparqlUpdate) in the change event, and the update commands are provided as one or more SPARQL Update commands to instruct indexer application 104 to delete certain triples, insert certain triples, and/or modify the subjects and predicates of certain triples. As previously discussed, in other embodiments, when querying TRS service 114 in step 302, indexer application 104 can include a preference for a particular update command format, and TRS service 114 may provide indexer application 104 with update commands in that preferred format.

If, in step 306, indexer application 104 determines that the change event does not include one or more update commands, then, in step 308, indexer application 104 sends an HTTP GET request to the URI of the changed resource via network 108 to obtain all triples comprising the changed resource in its current state.

In step 310, indexer application 104 stores and indexes the changed resource on indexed data repository 106. In this exemplary embodiment, indexer application 104 stores all of the obtained triples comprising the changed resource in its current state, replacing any triples comprising an indexed version of the changed resource in its prior state.

If, in step 306, indexer application 104 determines that the change event includes one or more update commands, then, in step 312, indexer application 104 determines whether the currently indexed version of the changed resource to which the one or more update commands are to be applied is the correct version. In this exemplary embodiment, indexer application 104 compares the beforeETag of the changed resource found in the change event with the ETag of the currently indexed version of the changed resource in indexed data repository 106. A mismatch of these ETags indicates that the currently indexed version of the changed resource is not the correct version, and that applying the update instructions would be improper. A match of these ETags indicates that the currently indexed version of the changed resource is the correct version to which to properly apply the update instructions. In other embodiments, indexer application 104 may use other techniques to ensure that the currently indexed version is the correct version.

If, in step 312, indexer application 104 determines that the currently indexed version of the changed resource to which the one or more update commands are to be applied is not the correct version (i.e., the ETags mismatch), then, in steps 308 and 310, indexer application 104 sends an HTTP GET request to the URI of the changed resource via network 108 to obtain all triples comprising the changed resource in its current state and stores and indexes the changed resource on indexed data repository 106, as previously discussed. Indexer application 104 then sets the ETag of the newly indexed changed resource to the afterETag of the prior version of the changed resource.

If, in step 312, indexer application 104 determines that the currently indexed version of the changed resource to which the one or more update commands are to be applied is the correct version (i.e., the ETags match), then, in step 314, indexer application 104 executes the update commands. In this exemplary embodiment, indexer application 104 accesses the indexed version of the resource in indexed data repository 106, to which it then makes the one or more changes to triples that are specified by the update commands. For example, if the state change of the changed resource resulted in the addition of a triple, the change event may include an "INSERT" SPARQL Update command specifying the subject, predicate, and object of the triple that was inserted in the changed resource. In step 314, indexer application 104 would access the indexed version of the changed resource in indexed data repository 106 and insert the triple as instructed by the SPARQL Update command, thereby updating the indexed version of the changed resource stored on indexed data repository 106 to reflect the current state of the changed resource stored on production data repository 116. Again, indexer application 104 then sets the ETag of the indexed changed resource to the afterETag of the prior version of the changed resource.

If, in step 304, indexer application 104 determines that the change event is a deletion change event, then, in step 316, indexer application deletes from indexed data repository 106 all triples comprising the changed resource.

After performing step 310, step 314, or step 316, processing proceeds to step 318, where indexer application 104 determines whether there are additional new change events in the change log.

If, in step 318, indexer application 104 determines that there are additional new change events in the change log, then processing repeats at step 304, where indexer application 104 determines whether the next oldest change event of the identified new change events is a modification change event, a creation change event, or a deletion change event, and so on for each identified new change event, in order from oldest to most recent (i.e., indexer application 104 analyzes the new change event having the second lowest numerical order value, followed by the new change event having the third lowest numerical order value, etc.). Processing new change events from oldest to most recent helps ensure that indexer application 104 updates the indexed versions of the member resources of the TRS in the correct order and keeps them up-to-date.

Accordingly, by performing the operational steps of FIG. 3, indexer application 104 can build and maintain a searchable index of the resources stored on production data repository 116, while also decreasing the extent to which changed resources must be retrieved via HTTP GET requests. Including one or more update commands in change events allows indexer application 104 to update indexed resources in-place on indexed data repository 106, thereby obviating the need for indexer application 104 to retrieve all changed resources via HTTP GET requests, and obviating the need for indexer application 104 to replace all triples of a prior version of a changed resource with newly obtained triples (i.e., a partial update of a changed resource as compared to a full replacement of the changed resource). By reducing the amount of changed resources that must be retrieved via HTTP requests and modifying changed resources in-place, embodiments of the present invention can conserve computational resources and network bandwidth, both of which can increase the speed and efficiency with which indexer application 104 can index changed resources, and thereby increase the currency of the indexed resources stored on indexed data repository 106.

EXAMPLE

The following example illustrates hypothetical TRS data comprising change events having update commands. For example, this TRS data may be obtained from TRS service 114 in response to a query by indexer application 104:

```
@prefix trs:   <http://open-services.net/ns/core/trs#> .
@prefix trsx:  <http://example.com/ns/trsx#> .
@base <http://example.com/trs> .
<>
    a trs:TrackedResourceSet ;
    trs:base <http://example.com/trsbase> ;
    trs:changeLog
        [ a trs:ChangeLog ;
          trs:changes (
             <#121>
             <#120>
             <#119> )
        ] .
<#121>
    a trs:Creation ;
    trs:changed <http://example.com/part/42/revision/25> ;
    trs:order 121 ;
```

-continued

```
    trsx:createdFrom <http://example.com/part/42/revision/17> ;
    trsx:beforeETag "42886" ;
    trsx:afterETag "62553" ;
    trsx:sparqlUpdate """DELETE WHERE
{ <http://example.com/part/42> <http://example.com/ns#color> "red" }
INSERT
{ <http://example.com/part/42> <http://example.com/ns#color> "green" }
WHERE { } """ .
<#120>
    a trs:Modification ;
    trs:changed <http://example.com/elements/22> ;
    trs: order 120 ;
        trsx:beforeETag "72635" ;
        trsx:afterETag "91273" ;
    trsx:sparqlUpdate """DELETE WHERE
{ <http://example.com/elements/22> <http://purl.org/dc/terms/title>
?value }
INSERT
{ <http://example.com/elements/22> <http://purl.org/dc/terms/title> "Mr."
} WHERE { } """ .
<#119>
    a trs:Modification ;
    trs:changed <http://example.com/elements/31> ;
    trs:order 119 .
```

As can be seen, in this example, the URI of the TRS is "http://example.com/trs". Indexer application 104 may obtain the TRS data depicted above by sending an HTTP GET request to this URI via network 108. The TRS data includes a change log having three change events for three different changed resources, identified by their URIs: http://example.com/elements/22 (hereafter "Resource 22"); http://example.com/part/42/revision/25 (hereafter "Resource 25"); and http://example.com/elements/31 (hereafter "Resource 31"). The change event for Resource 31 is a modification change event and is the oldest (i.e., trs:Modification and trs:order 119), followed by the modification change event for Resource 22 (i.e., trs:Modification and trs:order 120), and, most recently, the creation change event for Resource 25 (i.e., trs:Creation and trs:order 121).

The modification change event for Resource 31 does not include any update commands. For example, pursuant to specified criteria, TRS service 114 may have determined that update commands should not be included (e.g., step 204 of FIG. 2). Thus, to index Resource 31, indexer application 104 would send an HTTP GET request to the URI "http://example.com/elements/31" to obtain all triples comprising Resource 31, and then replace all triples comprising the previously indexed version of Resource 31 with the obtained triples in indexed data repository 106 (e.g., steps 308 and 310 of FIG. 3).

The modification change event for Resource 22 includes update commands. In this example, the update commands are provided in SPARQL Update format in a property named trsx:sparqlUpdate. These update commands apply to the version of Resource 22 that has the HTTP ETag given by the property trsx:beforeETag (e.g., "72635"). If indexed data repository 106 does not contain that version of Resource 22 (i.e., the ETag of the currently indexed version is not "72635", or no there is no currently indexed version of Resource 22), then the update command cannot be applied. In that case, indexer application 104 would proceed as if there were no update commands by sending an HTTP GET request the URI of Resource 22 to obtain and index all triples comprising Resource 22, then update the ETag of indexed Resource 22 to the afterETag "91273". Otherwise, the update commands are applied. Here, the SPARQL Update commands instruct indexer application 104 to delete all triples having the subject "http://example.com/elements/

22", the predicate "http://purl.org/dc/terms/title", and any value as an object (i.e., ?value), and to insert one triple having the subject "http://example.com/elements/22", the predicate "http://purl.org/dc/terms/title", and the literal value "Mr.". Accordingly, unlike the modification change event for Resource 31, updating the indexed version of Resource 22 does not require that indexer application 104 send an HTTP GET request to obtain all triples comprising Resource 22 and replace all triples comprising the previously indexed version of Resource 22 with the obtained triples in indexed data repository 106. Instead, indexer application 104 executes the update commands, and updates only those triples of Resource 22 that differ between the previously indexed version and its current state (e.g., step 314 of FIG. 3). Indexer application 104 then sets the ETag of the indexed version of Resource 22 to the value specified by the trsx:afterETag property (e.g., "91273") of the previously indexed version of Resource 22.

The creation change event for Resource 25 indicates that Resource 25 was added to the TRS. Resource 25 is a revision resource and includes a trsx:createdFrom property specifying the changed resource from which the new revision Resource 25 was created (i.e., the revision resource having the URI "http://example.com/part/42/revision/17", hereafter "Resource 17"). The update commands apply to the version of Resource 17 having the ETag "42886". If indexed data repository 106 does not contain that version of Resource 17, indexer application 104 would ignore the update commands and send an HTTP GET request to the URI of Resource 25 to obtain and index all triples comprising Resource 25, then update the ETag of indexed Resource 25 to the afterETag "62553"). Otherwise, the update commands are applied to the indexed version of Resource 17 in indexed data repository 106. Here, the SPARQL Update commands instruct indexer application 104 to delete all triples having the subject "http://example.com/part/42", the predicate "http://example.com/ns#color", and the value "red", and to insert one triple having the subject "http://example.com/part/42", the predicate "http://example.com/ns#color", and the value "green". Indexer application 104 would then update the ETag of indexed Resource 25 (which was previously Resource 17) to the afterETag "62553".

Figure 4:
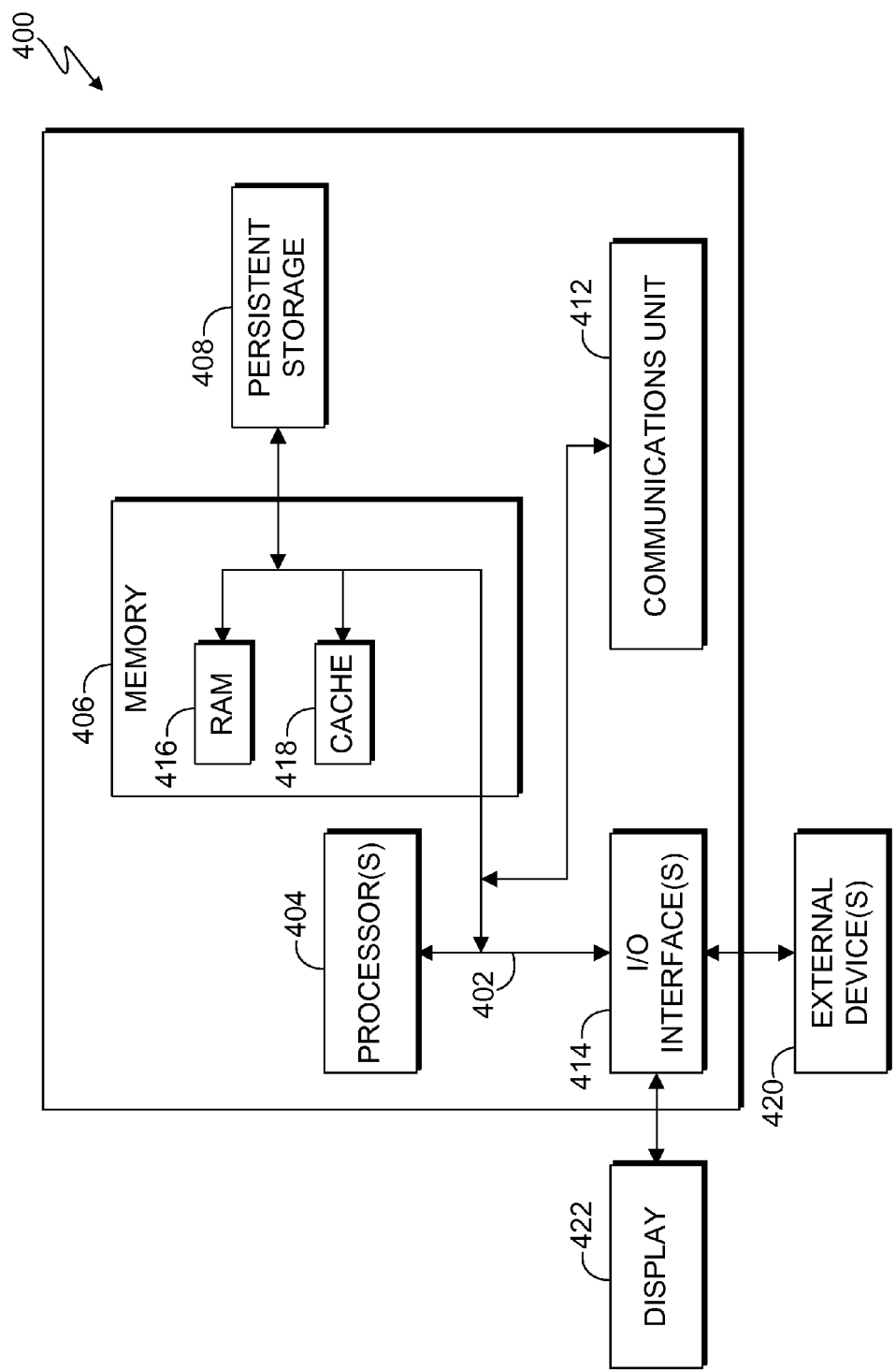
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software and data is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 108). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to consumer computer system 102 and provider computer system 110 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
one or more computer readable storage media and program instructions stored on the one or more computer readable storage media, the program instructions comprising:
program instructions to, responsive to a state change of a resource in a tracked resource set, create one or more update commands that describe the state change of the resource;
program instructions to create a change event for the resource in a change log, wherein the change event comprises the created one or more update commands that describe the state change of the resource, and the change event further comprises a version identifier of the resource before the state change and a version identifier of the resource after the state change; and
program instructions to, responsive to a state change of a second resource in the tracked resource set, determine, based on a relative cost of updating an indexed version of the second resource with the one or more update commands versus a relative cost of replacing an indexed resource of the second resource using an HTTP GET request to obtain triples comprising the second resource, to create one or more update commands describing the state change of the second resource in a change event for the second resource.

2. The computer program product of claim 1, wherein the change event is a modification change event or a creation change event.

3. The computer program product of claim 1, wherein the one or more commands that describe the state change of the resource comprise at least one of: one or more instructions to insert a resource description framework (RDF) triple into one or more RDF triples associated with the resource, or one or more instructions to delete an RDF triple from the one or more RDF triples associated with the resource.

4. The computer program product of claim 3, wherein the one or more instructions comprise at least one of: a SPARQL Update command or an RDF Patch command.

5. The computer program product of claim 1, wherein the version identifiers are provided as additional properties of the change event in the form of HTTP Etags.

6. A computer system comprising:
one or more computer processors;
one or more computer readable storage media;
program instructions stored on the computer readable storage media for execution by at least one of the one or more processors, the program instructions comprising:
program instructions to, responsive to a state change of a resource in a tracked resource set, create one or more update commands that describe the state change of the resource;
program instructions to create a change event for the resource in a change log, wherein the change event comprises the created one or more update commands that describe the state change of the resource, and the change event further comprises a version identifier of the resource before the state change and a version identifier of the resource after the state change; and
program instructions to, responsive to a state change of a second resource in the tracked resource set, determine, based on a relative cost of updating an indexed version of the second resource with the one or more update commands versus a relative cost of replacing an indexed resource of the second resource using an HTTP GET request to obtain triples comprising the second resource, to create one or more update commands describing the state change of the second resource in a change event for the second resource.

7. The system of claim 6, wherein the change event is a modification change event or a creation change event.

8. The system of claim 6, wherein the one or more commands that describe the state change of the resource comprise at least one of: one or more instructions to insert a resource description framework (RDF) triple into one or more RDF triples associated with the resource, or one or more instructions to delete an RDF triple from the one or more RDF triples associated with the resource.

9. The system of claim 8, wherein the one or more instructions comprise at least one of: a SPARQL Update command or an RDF Patch command.

10. The computer system of claim 6, wherein the version identifiers are provided as additional properties of the change event in the form of HTTP Etags.

* * * * *